(12) United States Patent
Reinders et al.

(10) Patent No.: US 11,054,157 B2
(45) Date of Patent: Jul. 6, 2021

(54) TWO STAGE COOLER

(71) Applicant: Oxycom Beheer B.V., Raalte (NL)

(72) Inventors: Johannes Antonius Maria Reinders, Warnsveld (NL); Berend Jan Reinders, Warnsveld (NL); Mark Hakbijl, Zwolle (NL); Alexander John Banz, St-Prex (CH)

(73) Assignee: Oxycom Beheer B.V., Raalte (NL)

( * ) Notice: Subject to any disclaimer, the term of this patent is extended or adjusted under 35 U.S.C. 154(b) by 21 days.

(21) Appl. No.: 16/316,649

(22) PCT Filed: Jul. 11, 2017

(86) PCT No.: PCT/NL2017/050465
§ 371 (c)(1),
(2) Date: Jan. 10, 2019

(87) PCT Pub. No.: WO2018/012970
PCT Pub. Date: Jan. 18, 2018

(65) Prior Publication Data
US 2019/0186763 A1    Jun. 20, 2019

(30) Foreign Application Priority Data
Jul. 11, 2016 (GB) ..................... 1612042

(51) Int. Cl.
*F24F 5/00* (2006.01)
*F24F 1/0087* (2019.01)
(Continued)

(52) U.S. Cl.
CPC .......... *F24F 5/0035* (2013.01); *F24F 1/0007* (2013.01); *F24F 1/0087* (2019.02);
(Continued)

(58) Field of Classification Search
CPC ...... F24F 5/0035; F24F 1/0007; F24F 1/0087; F24F 1/0011; Y02B 30/545
See application file for complete search history.

(56) References Cited

U.S. PATENT DOCUMENTS 4,312,819 A * 1/1982 Leyland .................... F24F 6/04
                                                   261/152
4,361,525 A * 11/1982 Leyland .................... F24F 6/04
                                                   165/60

(Continued)

FOREIGN PATENT DOCUMENTS

| CN | 201314651 Y | 9/2009 |
|---|---|---|
| WO | 2013/095105 A1 | 6/2013 |
| WO | 2013095105 A1 | 6/2013 |

OTHER PUBLICATIONS

GB Search Report of GB 1612042.0 dated Dec. 15, 2016.
International Search Report of PCT/NL2017/050465 dated Oct. 26, 2017.

*Primary Examiner* — Frantz F Jules
*Assistant Examiner* — Lionel Nouketcha
(74) *Attorney, Agent, or Firm* — N.V. Nederlandsch Octrooibureau; Catherine A. Shultz; Katelyn J. Bernier (57) ABSTRACT

A two stage evaporative cooling device has a central chamber, divided into an upper chamber and a lower chamber by a divider. one or more heat exchange units surrounding the central chamber; an upper fan arranged above the upper chamber and a lower fan arranged below the lower chamber; and a water circuit; wherein each heat exchange unit comprises an evaporative cooling element and an air to water pre-cooler, the pre-cooler being placed ahead of a lower portion of the cooling element and the water circuit is arranged to irrigate the cooling element and collect the irrigated water below the cooling element for delivery to the pre-cooler whereby pre-cooled air may be drawn inwardly (Continued)

through the pre-cooler and the lower part of the cooling element by the lower fan and ambient air may be drawn inwardly through the upper part of the cooling element by the upper fan.

13 Claims, 5 Drawing Sheets

(51) Int. Cl.
  *F24F 1/0007* (2019.01)
  *F28D 5/00* (2006.01)
  *F24F 1/0011* (2019.01)
(52) U.S. Cl.
  CPC ......... *F24F 1/0011* (2013.01); *F24F 1/00073* (2019.02); *F28D 5/00* (2013.01); *Y02B 30/54* (2013.01)

(56) References Cited

U.S. PATENT DOCUMENTS

| | | | |
|---|---|---|---|
| 4,380,910 A | 4/1983 | Hood et al. | |
| 4,478,767 A * | 10/1984 | Watanabe | F24F 6/04 |
| | | | 261/110 |
| 4,612,778 A | 9/1986 | Medrano | |
| 4,926,656 A * | 5/1990 | Hickley | F24F 5/0035 |
| | | | 62/310 |
| 8,191,872 B2 * | 6/2012 | Reinders | F28F 13/18 |
| | | | 261/153 |
| 2004/0226698 A1 * | 11/2004 | Reinders | F28D 5/00 |
| | | | 165/110 |
| 2009/0000325 A1 | 1/2009 | Johnson | |
| 2009/0007583 A1 * | 1/2009 | Clarkson | F28D 9/0062 |
| | | | 62/304 |

* cited by examiner

TWO STAGE COOLER

BACKGROUND OF THE INVENTION

1. Field of the Invention

The present invention relates to an evaporative cooling device and more particularly to a compact direct evaporative cooler provided with precooling. The invention also relates to the use of such a device in providing a supply of cooling air.

2. Description of the Related Art

Evaporative cooling is well known as a method of providing a flow of cooling air. For air that is above its dew point, a reduction of the absolute temperature of the air can be achieved by the introduction of moisture. When this takes place directly into the air stream, the temperature of the air may be lowered as far as the wet bulb temperature. Such direct evaporative coolers, sometimes known as swamp coolers are very effective in hot dry climates. They are also highly efficient, since they require little more energy than for operation of a fan.

In cases where the wet bulb temperature of the air is above the desired temperature for a habitable space, such coolers may not be sufficient. In such cases, conventional air conditioning units or hybrid systems may be needed. Compared to evaporative systems, air conditioning units require significant energy to operate their compressors.

Attempts have been made to improve the performance of direct evaporative coolers by providing a pre-cooling stage in front of at least part of the evaporative cooler. The pre-cooling stage may use cooled water from the evaporative cooling stage in an air-water cooling unit. By pre-cooling the air, a lower wet bulb temperature may be achieved. In this case, only the coolest portion of the air exiting the evaporative cooler is used, with the remainder being exhaust to ambient. This reduces the overall efficiency of the cooling and in order to have sufficient air for delivery, a considerable frontal area of the evaporative cooler is required. Scaling up of such devices is not always practical.

BRIEF SUMMARY OF THE INVENTION

According to the invention there is provided an evaporative cooling device comprising a central chamber, the central chamber defining an upper chamber and a lower chamber separated by a divider; one or more heat exchange units surrounding the central chamber; an upper fan arranged above the upper chamber and a lower fan arranged below the lower chamber; and a water circuit; wherein each heat exchange unit comprises an evaporative cooling element and an air to water pre-cooler, the pre-cooler being placed ahead of a lower portion of the cooling element and the water circuit is arranged to irrigate the cooling element and collect the irrigated water below the cooling element for delivery to the pre-cooler whereby pre-cooled air may be drawn inwardly through the pre-cooler and the lower part of the cooling element by the lower fan and ambient air may be drawn inwardly through the upper part of the cooling element by the upper fan. By surrounding the central chamber with the heat exchange units a compact configuration can be achieved with the lower fan delivering the coolest air downwardly for use e.g. in a habitable space and the upper fan delivering the humidified air upwardly, where it can be exhaust to ambient.

In this context, it is noted that although the preferred configuration is with the air supply delivered downwards by the lower fan, the cooling device may be oriented otherwise e.g. it may be inverted and deliver the coldest air upwards. Furthermore, although the air will generally be delivered to a habitable space, this is intended to also include exterior public areas e.g. where people may gather and require cooling.

In one embodiment, the water circuit may comprises a sump for collection of the irrigated water with the sump comprising an annular channel surrounding the lower fan. This ensures that water can be collected from all of the heat exchange units and a single pump may supply this to the respective pre-coolers. In an alternative, separate sumps may be provided beneath each heat exchange unit with a pump for each pre-cooler.

An important feature of the invention is that the heat exchange unit or units surround the central chamber. This may be achieved with a single unit having e.g. a circumferential or annular shape. In one preferred configuration, four heat exchange units may be arranged in a square around the central chamber. This has considerable advantages in terms of production, since the heat exchangers may be standardised and the resulting device is compact. It will however be understood that other shapes such as hexagons, polygons, rectangles, ovals and otherwise may also be implemented and that the heat exchange units need not completely surround the central chamber in an uninterrupted manner in that they may be spaced from each other e.g. by frame members.

Additionally, although both the evaporative cooling elements and the pre-coolers may be arranged together and in the same quantities, it is not excluded that this be otherwise. Four evaporative cooling elements may be surrounded by a single pre-cooler or a single evaporative cooling element could be surrounded by a number of separate pre-coolers.

The evaporative cooling device may comprise a housing, defining a lower outlet from the lower chamber and an upper outlet from the upper chamber and having an outer periphery provided with inlet openings. The upper and lower fans may be engaged with the respective upper and lower outlets. There may also be provided removable screens located across the inlet openings providing for easy access and assembly.

The evaporative cooling elements may be any suitable element such as commercially available fibrous or plastic layers. According to a most preferred embodiment of the invention, the one or more evaporative cooling elements may each comprise a stack of finned plates of aluminium material. Such arrangements have been found to allow an extremely compact configuration with high evaporation rates per unit volume and relatively low pressure drop. Without wishing to be bound by theory, it is also believed that the aluminium material assists in transferring heat within the element to optimise heat exchange over the complete surface area.

The plates may be arranged to extend vertically and inwardly i.e. in the flow direction and are spaced from each other laterally i.e. perpendicular to the flow direction. The vertical orientation assists the flow of water down the plates. Furthermore, the fins may be formed by slits through the plate which may also extend vertically. The fins may be displaced laterally from the plate and may in particular be displaced laterally to a number of different offset positions. Cooling elements of this type have been described in WO2013095105, the contents of which are incorporated herein by reference in their entirety, and are marketed under the name Oxyvap by Oxycom Fresh Air b.v.

It is also most preferable that the one or more evaporative cooling elements are provided with a water retaining coating. In the case that the complete cooling element is formed of a water retaining or wicking material, this may not be necessary. Nevertheless, for use with impervious materials such as plastics and the above described aluminium surfaces, a water retaining surface allows better retention of water within the structure of the evaporative cooling element. The water retaining coating may comprise an open fibrous structure, such as that described in the above-mentioned WO2013095105, which is particularly advantageous in the context of aluminium fins.

One particular advantage of the structure described, is that the divider may be movable within the central chamber, whereby the relative sizes of the upper chamber and lower chamber can be varied. By moving the divider upwards, the amount of air drawn by the lower fan can be increased and vice-versa. It will be understood that the capacity of the lower fan needs to be able to meet the increased flow too. The divider may be moved fully upwards such that all air passes downwards through the lower fan for delivery to the habitable space or user. It will be understood that in this configuration, the device will be able to operate as a ventilation unit or as a direct evaporative cooler but not as a two-stage cooler. It will be understood that the position of the divider need not correspond directly to the location of the pre-cooler.

Preferably, the fans are also individually controlled such that their delivery can be varied according to the position of the divider. The fans may, in any case, be individually controlled irrespective of movement of the divider. Additionally, control of the position of the divider may be used to adjust the temperature of the air being delivered and an appropriate controller may be implemented to include this function.

According to one aspect, the water circuit may comprise a pump, arranged to cause circulation of water through the pre-cooler for delivery to the evaporative cooling element. The pump may be placed at any location although generally, this will be located above a sump and before the pre-cooler. There may be a single pump for all of the heat exchange units or multiple pumps.

The device has shown itself to be extremely efficient in displacing large quantities of air. Due to the focussed downward delivery of the coolest air with the upward expulsion of waste air, the device may be conveniently used outdoors in a public space. To this end, the device is provided with a support, to maintain the heat exchange units at a suitable distance above the ground. This will generally be at least 2 metres or the height of a person such that ambient air is drawn in at a higher level and a layer of cooler air is maintained below the level of the lower fan. The support may be a column through which the lower fan may deliver air downwards. In an alternative, the column is conical and concave serving to distribute air radially outwards at the foot of the column.

The invention also relates to a method of operating an evaporative cooling device to deliver a supply of cooled air to a habitable space, the method comprising: trickling water over an evaporative cooling element; passing a first volume of air through a first portion of the evaporative cooling element to cool the water and exhausting the air to ambient in a first axial direction; delivering the cooling water to an air to water pre-cooler; passing a second volume of air through the pre-cooler and through a second portion of the evaporative cooling element and exhausting the air to the habitable space in a second axial direction opposite to the first axial direction.

The evaporative cooling device may be an evaporative cooling device as described above and the habitable space may be an outdoor public area.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
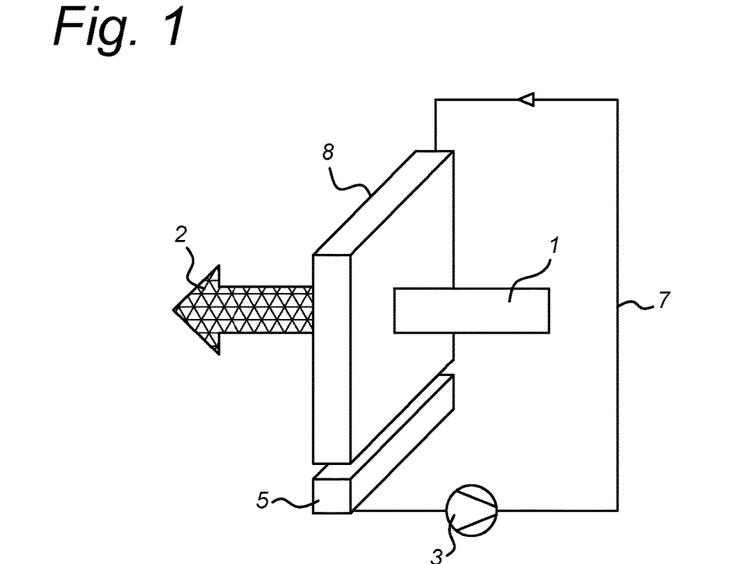
FIG. 1 shows a prior art configuration of a direct evaporative cooler.
Figure 2:
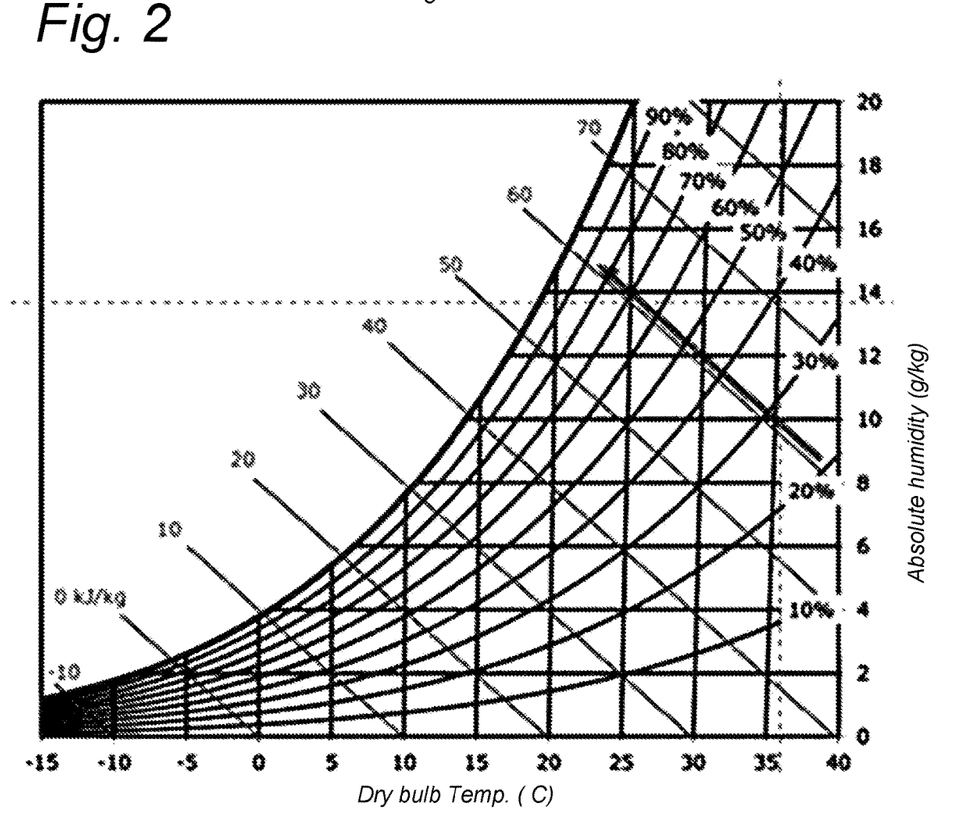
FIG. 2 shows the enthalpy diagram for the cooler of FIG. 1.

FIG. 1 shows a schematic view of operation of a conventional direct evaporative cooler such as the above mentioned Oxyvap™ pad described in WO2013095105. Hot dry air 1 is passed through the pad 8 to which water is supplied by water circuit 7 including pump 3 and sump 5. The air is humidified by the water as it passes through the pad 8 and exits as colder and more humid air 2 at the wet-bulb temperature (or close thereto). In FIG. 2, it may be seen that air having an initial dry-bulb temperature of 38° C. and 21% humidity can be cooled to around the wet bulb temperature of 21° C. In actual practice, 90% efficiency may be achieved and the outlet temperature may be around 1.7° C. higher than the wet-bulb temperature. Due to the cooling effect, the water exiting the pad 8 and collected in the sump 5 is also at the wet bulb temperature.

Figure 3:
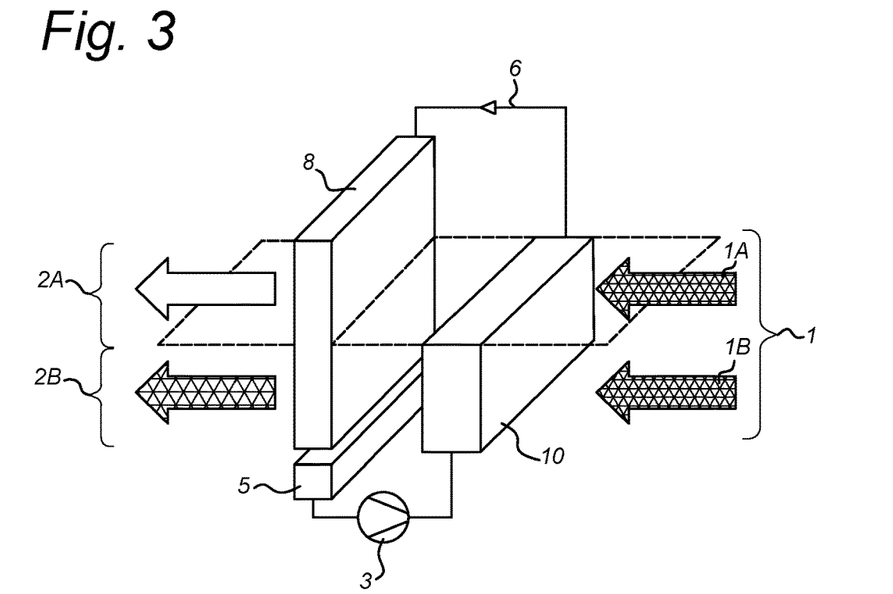
FIG. 3 shows the use of a pre-cooler in combination with the cooler of FIG. 1.

FIG. 3 shows an arrangement in which a pre-cooler 10 has been placed ahead of a lower portion of the Oxyvap pad 8 of FIG. 1. The cooled water collected in the sump 5 is pumped through the pre-cooler 10 before being delivered at 6 to the upper side of the Oxyvap pad 8. A first volume of air 1A passes through the upper portion of the pad 8 without passing through the pre-cooler 10. This first volume of air 1A serves to reduce the temperature of the cooling water descending through the Oxyvap pad 8 and may be discarded to ambient at 2A. A second volume of air 1B is drawn in through the pre-cooler 10 and is cooled without change to its absolute humidity. This air 1B, after passing through the pre-cooler 10, has a lower wet bulb temperature. It is then passed through the lower portion of the Oxyvap pad 8 where it is cooled by humidification and can then be delivered to a user or habitable space at the new, lower wet bulb temperature at 2B.

Figure 4:
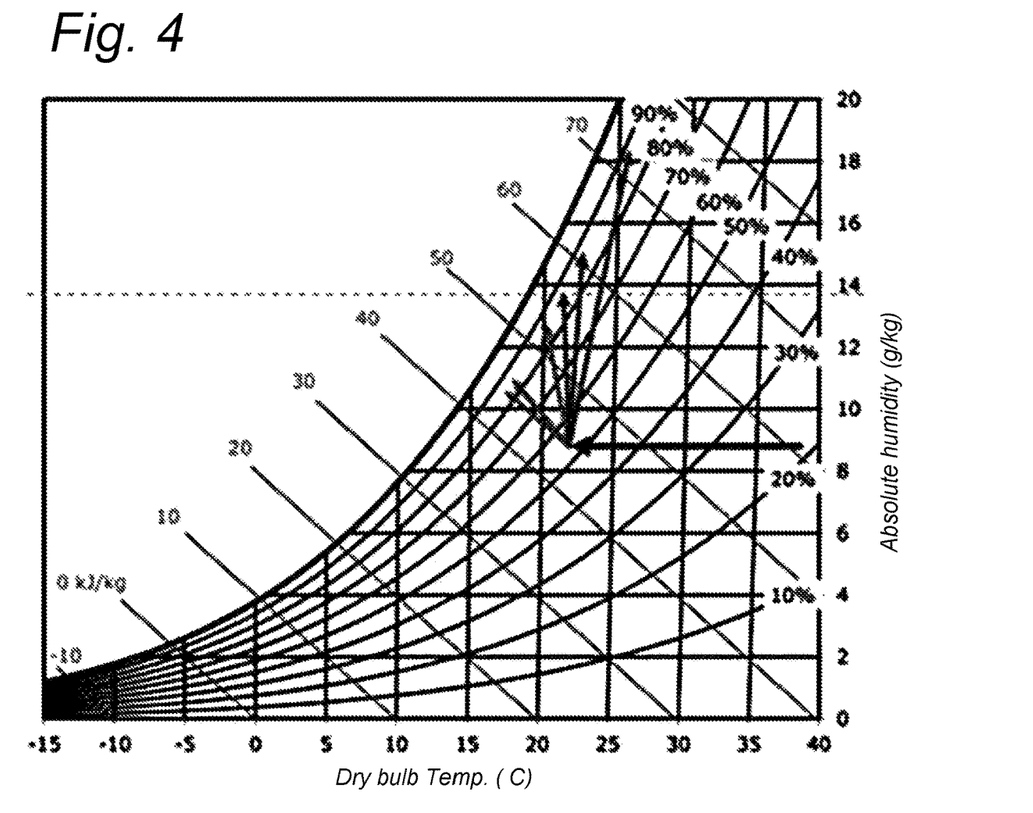
FIG. 4 shows the enthalpy diagram for the two-stage cooler of FIG. 3

FIG. 4 shows the enthalpy diagram for the second volume of air 1B-2B in the configuration of FIG. 3. It shows the cooling of the air at constant absolute humidity from an initial temperature of 38° C. to a dry bulb temperature of around 22° C. As this volume passes through the Oxyvap pad 8, it increases in humidity towards the saturation line and decreases in temperature to around 19° C. The wet bulb efficiency is 112%.

Figure 5:
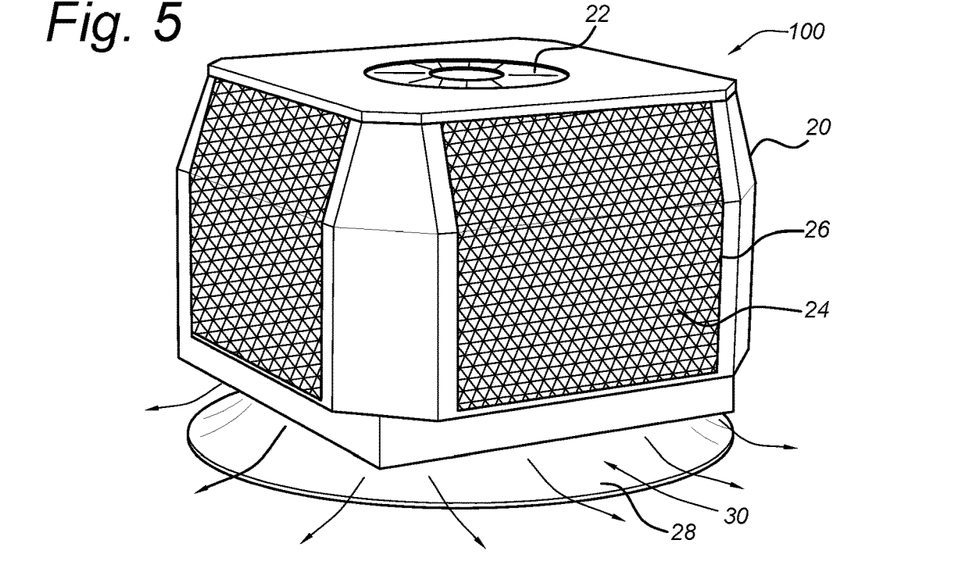
FIG. 5 shows a perspective view of an evaporative cooling device according to the invention.

FIG. 5 shows a perspective view of an evaporative cooling device 100 according to the invention. It comprises a generally square housing 20 having an upper outlet 22 and an outer periphery provided with inlet openings 24 on its four sides. Removable screens 26 are located across the inlet openings. The housing 20 and screens 26 are formed of marine grade powder coated aluminium. The housing 20 is supported on a conical column 28 that provides a lower outlet 30 distributing radially outwards beneath the device 100.

Figure 6:
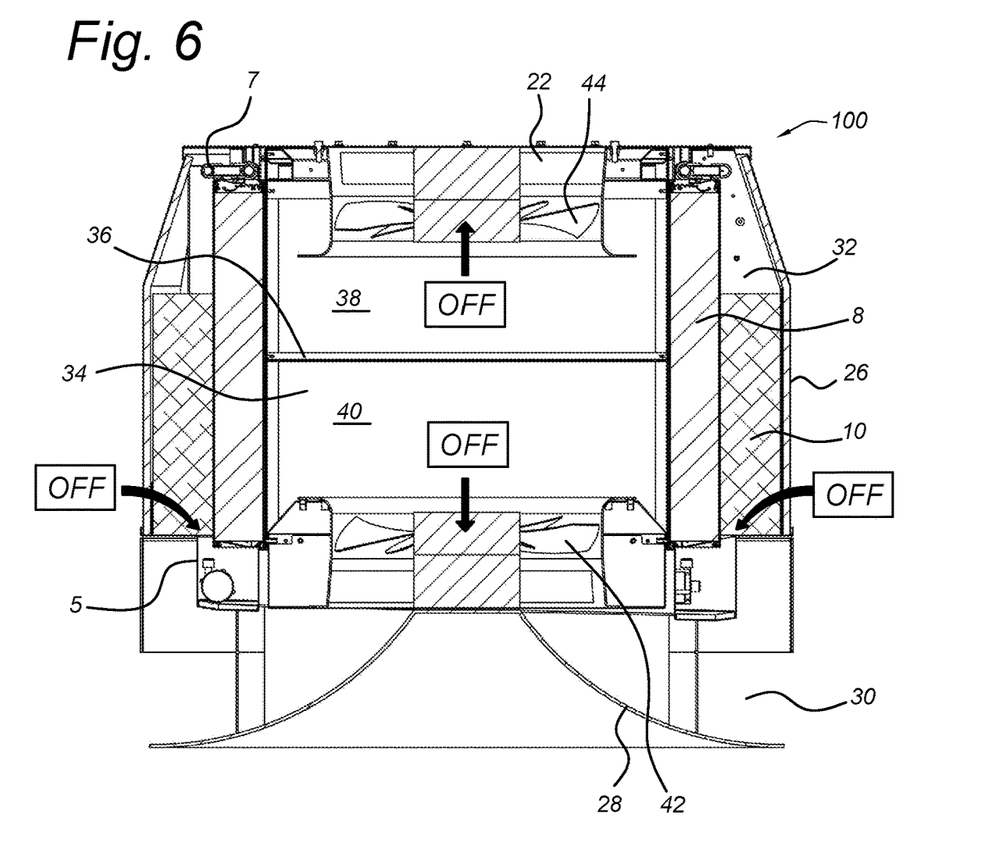
FIGS. 6 to 9 show cross-sections through the device of FIG. 5 in various modes of operation.

FIG. 6 shows a cross-section through the device 100 of FIG. 5 in the standby state. Behind each of the screens 26 is located a heat exchange unit 32 comprising an evaporative cooling element 8 and a pre cooler 10. These may be as shown in FIG. 3. In this case, the heat exchange units 32 are arranged around a central chamber 34, which is separated by a divider 36 into an upper chamber 38 and a lower chamber 40. The divider 36 is movable and controlled by an actuator (not shown) to move upward and downwards within the central chamber 34. Also visible are a lower fan 42 and an upper fan 44 in communication with the lower outlet 30 and upper outlet 22 respectively. Elements of the water circuit 7 are visible above the evaporative cooling elements 8 and the sump 5 is provided as an annular trough beneath the evaporative cooling elements 8. Other items are not shown in this view, including a controller to control operation of the device and a pump 3 for the water circuit 7. The conical column 28 is also shown in cross-section.

In the configuration shown in FIG. 6, the device 100 is in standby mode with both of the fans 42, 44 switched off. The divider 36 may also be moved downwards to close off the lower outlet 30 should this be required, e.g. to prevent air leakage from a habitable space as a winter seal.

Figure 7:
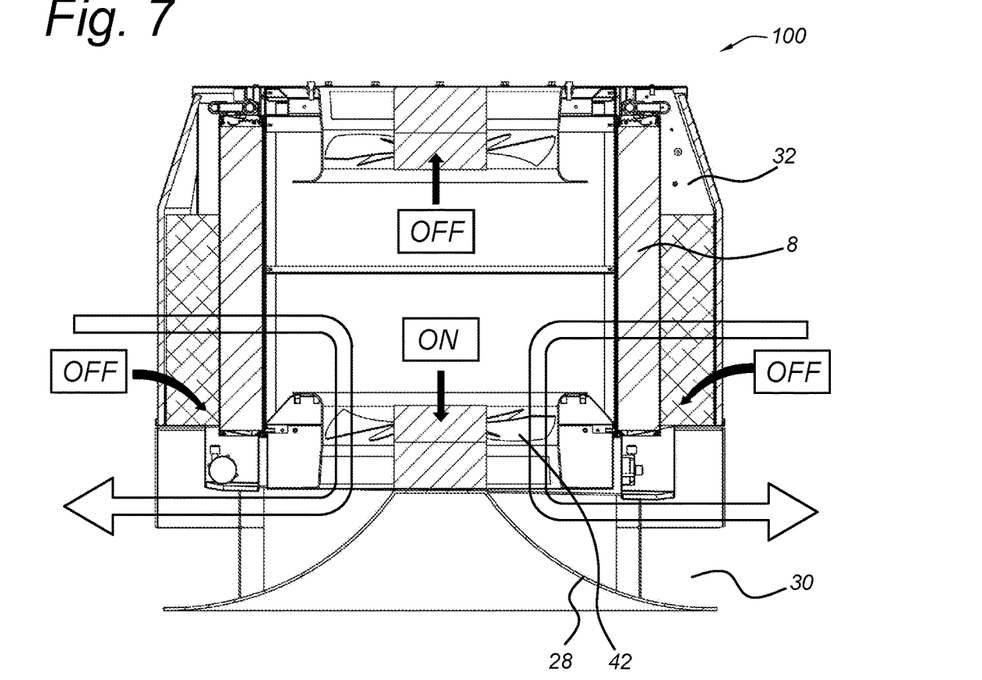

FIG. 7 shows the device 100 in ventilation mode with the lower fan 42 operating to draw air in through the heat exchange units 32 and direct it downwards through the lower outlet 30. The water circuit is not operational.

Figure 8:
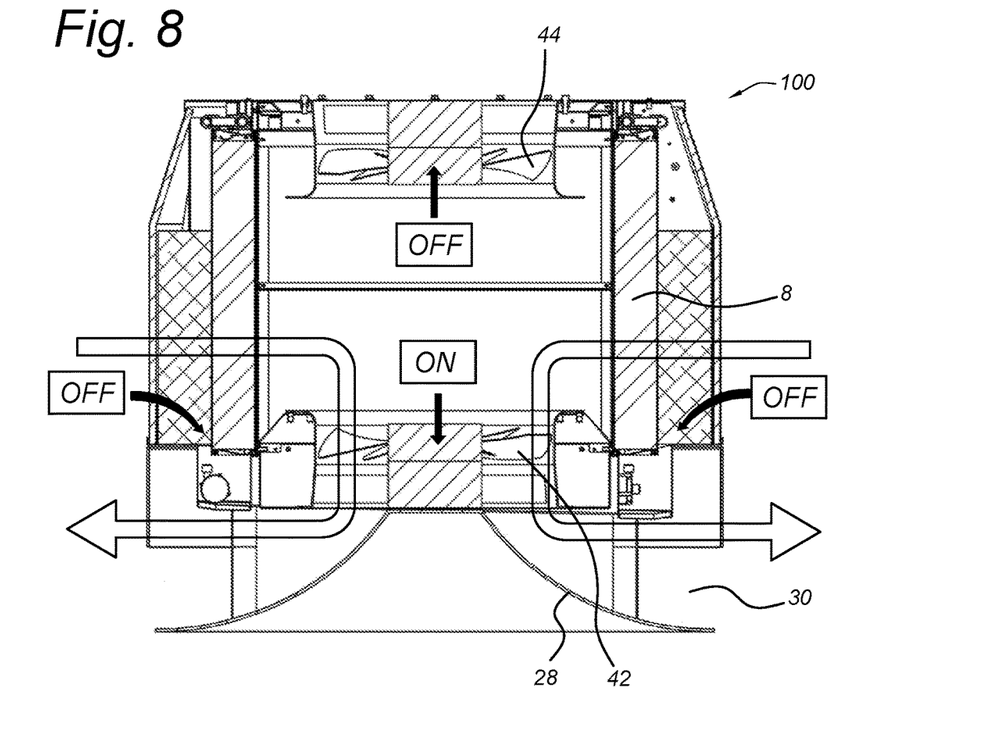

FIG. 8 shows the device 100 operating as a direct evaporative cooler. In this state, water is supplied by the water circuit directly to the evaporative cooling element 8, which causes humidification of the air that is directed downwards through the lower outlet 30 by the lower fan 42. The upper fan 44 is switched off. Although not shown, the divider 36 may be moved upwards to allow air to flow through the full area of the evaporative cooling element 8.

Figure 9:
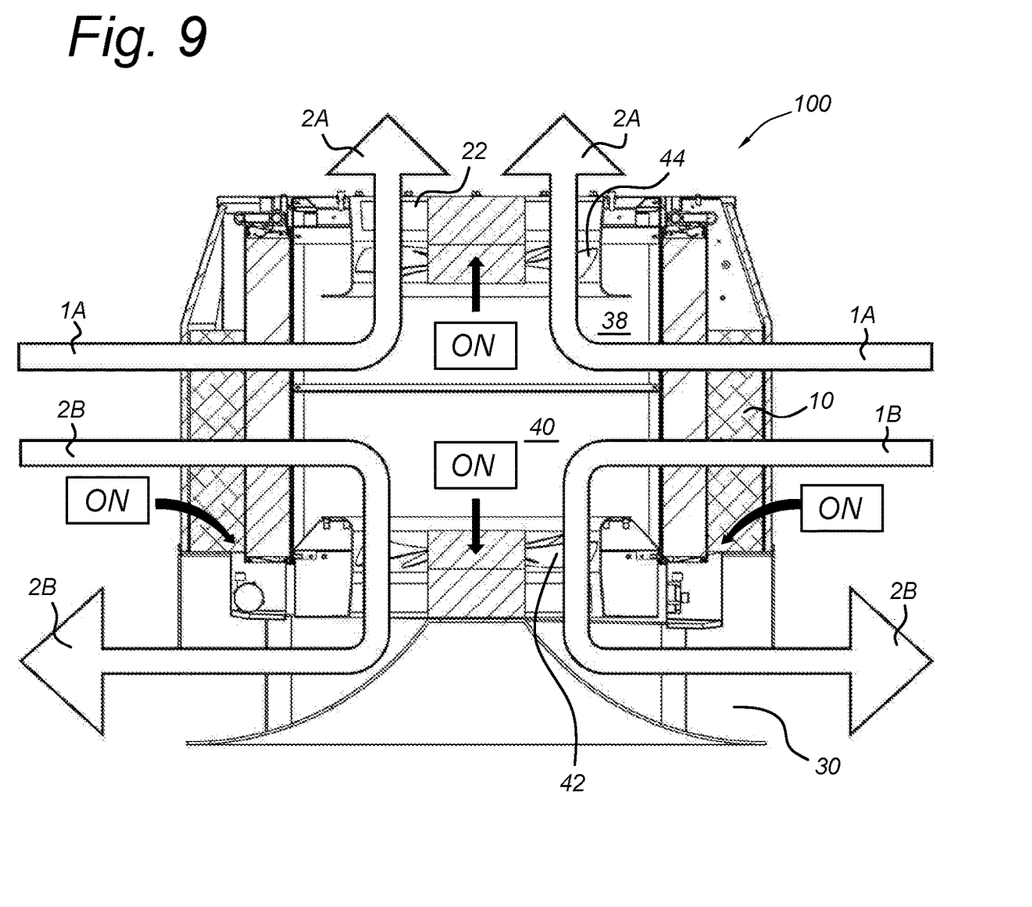

FIG. 9 shows the device operating as a two-stage cooler. In this state, both of the fans 42, 44 are operational and the water circuit and pump (not shown) operate to supply water through the pre-cooler 10. The device operates in the same manner as in FIG. 3, with a first volume of air 1A passing through the upper portion of the evaporative cooling element 8 and the upper chamber 38 to exhaust 2A at the upper outlet 22. A second volume of air 1B is cooled as it passes through the pre-cooler 10 and subsequently humidified and further cooled as it passes through the lower portion of the evaporative cooling element 8. It is exhaust 2B from the lower chamber 40 and lower outlet 30 by the lower fan 42.

The configuration shown is advantageous in that it can be easily installed in an open space to deliver cool humidified air to the open space. To this end, the column 28 should be of a height such that the device is supported above the level desired to remain cool. Ambient air 1 is drawn in above this level and the humid but slightly warmer waste air 2A is exhaust upwards out of the cooling zone.

Thus, the invention has been described by reference to certain embodiments discussed above. It will be recognized that these embodiments are susceptible to various modifications and alternative forms well known to those of skill in the art. In particular, the shape of the device and the positioning of the heat exchange units may be distinct from the schematically illustrated design.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. An evaporative cooling device comprising:
a central chamber, the central chamber defining an upper chamber and a lower chamber separated by a divider;
at least one heat exchange unit surrounding the central chamber;
an upper fan arranged above the upper chamber and spaced from the divider by the upper chamber,
a lower fan arranged below the lower chamber and spaced from the divider by the lower chamber; and
a water circuit;
wherein each heat exchange unit comprises an evaporative cooling element and an air to water pre-cooler, the pre-cooler being placed ahead of only a lower portion of the cooling element and the water circuit is arranged to irrigate the cooling element and collect the irrigated water below the cooling element for delivery to the pre-cooler whereby pre-cooled air may be drawn inwardly through the pre-cooler and the lower part of the cooling element by the lower fan and ambient air may be drawn inwardly through the upper part of the cooling element by the upper fan, and a location of the divider determines a quantity of pre-cooled air that passes through the lower part of the cooling element, the divider configured to be actuated by a controller to move upward or downward in the central chamber to close off air flow through either the upper fan or the lower fan.

2. The device according to claim 1, wherein the water circuit comprises a sump for collection of the irrigated water, the sump comprising an annular channel surrounding the lower fan.

3. The device according to claim 1, wherein the at least one heat exchange unit comprises four heat exchange units arranged in a square around the central chamber.

4. The device according to claim 1, wherein the at least one heat exchange unit comprises a single heat exchange unit that surrounds the central chamber.

5. The device according to claim 1, comprising a housing, defining a lower outlet from the lower chamber and an upper outlet from the upper chamber and having an outer periphery provided with inlet openings.

6. The device of claim 5, comprising removable screens located across the inlet openings.

7. The device according to claim 1, wherein the one or more evaporative cooling elements each comprise a stack of finned plates of aluminium material.

8. The device of claim 7, wherein the plates are arranged to extend vertically and inwardly and are spaced from each other laterally.

9. The device of claim 8, wherein the fins are formed by slits through the plate extending vertically and the fins are displaced laterally from the plate.

10. The device according to claim 1, wherein the one or more evaporative cooling elements are provided with a water retaining coating.

11. The device according to claim 1, wherein the water circuit comprises a pump, arranged to cause circulation of water through the pre-cooler for delivery to the evaporative cooling element.

12. A method of operating an evaporative cooling device, according to claim 1, to deliver a supply of cooled air to a habitable space, the method comprising:
   trickling water over an evaporative cooling element;
   passing a first volume of air only through a first portion of the evaporative cooling element to cool the water and exhausting the first volume of air to ambient in a first axial direction;
   delivering the cooling water to an air to water pre-cooler;
   passing a second volume of air through the pre-cooler and through a second portion of the evaporative cooling element and exhausting the second volume of air to the habitable space in a second axial direction opposite to the first axial direction.

13. An evaporative cooling device comprising:
   a central chamber, the central chamber defining an upper chamber and a lower chamber separated by a divider, the divider being equally spaced from the upper fan and the lower fan, whereby the upper chamber and the lower chamber are of similar size;
   one or more heat exchange units surrounding the central chamber;
   an upper fan arranged above the upper chamber and a lower fan arranged below the lower chamber, both fans being spaced from the divider, wherein the upper and lower fans are arranged to rotate about a vertical axis of the central chamber; and
   a water circuit;
   wherein each heat exchange unit comprises an evaporative cooling element and an air to water pre-cooler, the pre-cooler being placed ahead of only a lower portion of the cooling element and the water circuit is arranged to irrigate the cooling element and collect the irrigated water below the cooling element for delivery to the pre-cooler whereby pre-cooled air may he drawn inwardly through the pre-cooler and the lower part of the cooling element by the lower fan and ambient air may he drawn inwardly through the upper part of the cooling element by the upper fan, and
   wherein the fans are of equal size and configured so a flow of pre-cooled air drawn through the lower fan can be increased, while a flow of ambient air drawn through the upper fan can be decreased and vice-versa.

* * * * *